(12) United States Patent
Takii

(10) Patent No.: US 10,816,447 B2
(45) Date of Patent: Oct. 27, 2020

(54) HIGH-SPEED TENSION TESTING MACHINE

(71) Applicant: SHIMADZU CORPORATION, Kyoto-Shi, Kyoto (JP)

(72) Inventor: Tadaoki Takii, Kyoto (JP)

(73) Assignee: SHIMADZU CORPORATION, Kyoto-Shi, Kyoto (JP)

( * ) Notice: Subject to any disclaimer, the term of this patent is extended or adjusted under 35 U.S.C. 154(b) by 151 days.

(21) Appl. No.: 16/109,799

(22) Filed: Aug. 23, 2018

(65) Prior Publication Data

US 2019/0064041 A1 Feb. 28, 2019

(30) Foreign Application Priority Data

Aug. 24, 2017 (JP) .................. 2017-161105

(51) Int. Cl.
*G01N 3/08* (2006.01)
*G01N 3/10* (2006.01)

(52) U.S. Cl.
CPC ................. *G01N 3/08* (2013.01); *G01N 3/10* (2013.01)

(58) Field of Classification Search
CPC ............. G01N 3/08; G01N 3/10; G01N 3/066
See application file for complete search history.

(56) References Cited

FOREIGN PATENT DOCUMENTS

JP 2006010409 1/2006

*Primary Examiner* — David Z Huang
(74) *Attorney, Agent, or Firm* — JCIPRNET

(57) ABSTRACT

A high-speed tension testing machine is provided for reliably preventing slippage between a movable side grip tool and a support member even when the movable side grip tool is moved at high speed. The support member that supports a movable body of a displacement meter has an end part on the side opposite to the movable body, and the end part has a split groove structure for surrounding a small-diameter part of the movable side grip tool and has a structure for holding the small-diameter part of the movable side grip tool with function of a screw. Thus, a surface of the support member on the side of the movable side grip tool is in surface contact with a surface of a large-diameter part, constituting a step part, on the side of the support member, so as to prevent slippage between the movable side grip tool and the support member.

2 Claims, 4 Drawing Sheets

US 10,816,447 B2

HIGH-SPEED TENSION TESTING MACHINE

CROSS-REFERENCE TO RELATED APPLICATION

This application claims the priority benefit of Japan application serial no. 2017-161105, filed on Aug. 24, 2017. The entirety of the above-mentioned patent application is hereby incorporated by reference herein and made a part of this specification.

BACKGROUND

Technical Field

The disclosure relates to a high-speed tension testing machine for applying a tension testing force to a test piece at high speed.

Description of Related Art

Such a high-speed tension testing machine applies the tension testing force by moving the movable side grip tool at high speed while both ends of the test piece are gripped by the movable side grip tool and the fixed side grip tool. Then, the displacement amount of the test piece at this time is measured by a displacement meter.

The displacement meter includes a movable body connected to the movable side grip tool and a fixed body. The movable body is composed of a pipe made of a conductor, and the fixed body is composed of a coil. The displacement meter has a configuration for detecting change of the inductance of the coil caused by movement of the movable body to calculate elongation of the test piece. Here, the movable body of the displacement meter is connected to the movable side grip tool while being supported by a support member. Moreover, the fixed body of the displacement meter is supported by a support mechanism placed on a table (see Japanese Laid-open Patent Application No. 2006-10409).

FIG. 5 is a schematic vertical cross-sectional view showing how the support member 141 and the movable side grip tool 133 are fixed to each other in the conventional high-speed tension testing machine described above, and FIG. 6 is a schematic plan view thereof.

As shown in these figures, the support member 141 that supports the movable body 123 of the displacement meter has an end part on the side opposite to the movable body 123. The end part has a split groove structure for surrounding the movable side grip tool 133 and has a structure for holding the movable side grip tool 133 with the function of a screw 142.

When carrying out a high-speed tension test, it is necessary to move the movable side grip tool 133 rapidly. For this reason, a large acceleration acts on the movable side grip tool 133 and the support member 141, and due to the inertial force, the movable side grip tool 133 and the support member 141 may slip from each other. As a result, a positional deviation occurs between the movable side grip tool 133 and the support member 141, resulting in an error in the result of the high-speed tension test.

SUMMARY

In view of the above, the disclosure provides a high-speed tension testing machine that reliably prevents the movable side grip tool and the support member from slipping from each other even when the movable side grip tool is moved at high speed.

According to an embodiment of the disclosure, a high-speed tension testing machine is provided for applying a tension testing force to a test piece, which is gripped at both ends by a movable side grip tool and a fixed side grip tool, by moving the movable side grip tool at high speed. The high-speed tension testing machine includes: a displacement meter including a movable body and a fixed body for measuring displacement of the test piece based on a positional relationship between the movable body and the fixed body; and a support member connected to the movable side grip tool and supporting the movable body of the displacement meter. A step part is formed in an area of the movable side grip tool on a side opposite to the test piece, and a surface of the support member on the side of the movable side grip tool and a surface of the step part on the side of the support member are in surface contact with each other.

According to an embodiment of the disclosure, in the above-described high-speed tension testing machine, the movable body of the displacement meter comprises a pipe made of a conductor and the fixed body comprises a coil, and a displacement amount of the pipe is calculated by detecting an inductance change amount of the coil caused by movement of the pipe.

According to the disclosure, since the support member and the step part of the movable side grip tool are in surface contact with each other, it is possible to reliably prevent the movable side grip tool and the support member from slipping from each other even when the movable side grip tool is moved at high speed.

DESCRIPTION OF THE EMBODIMENTS

Figure 1:
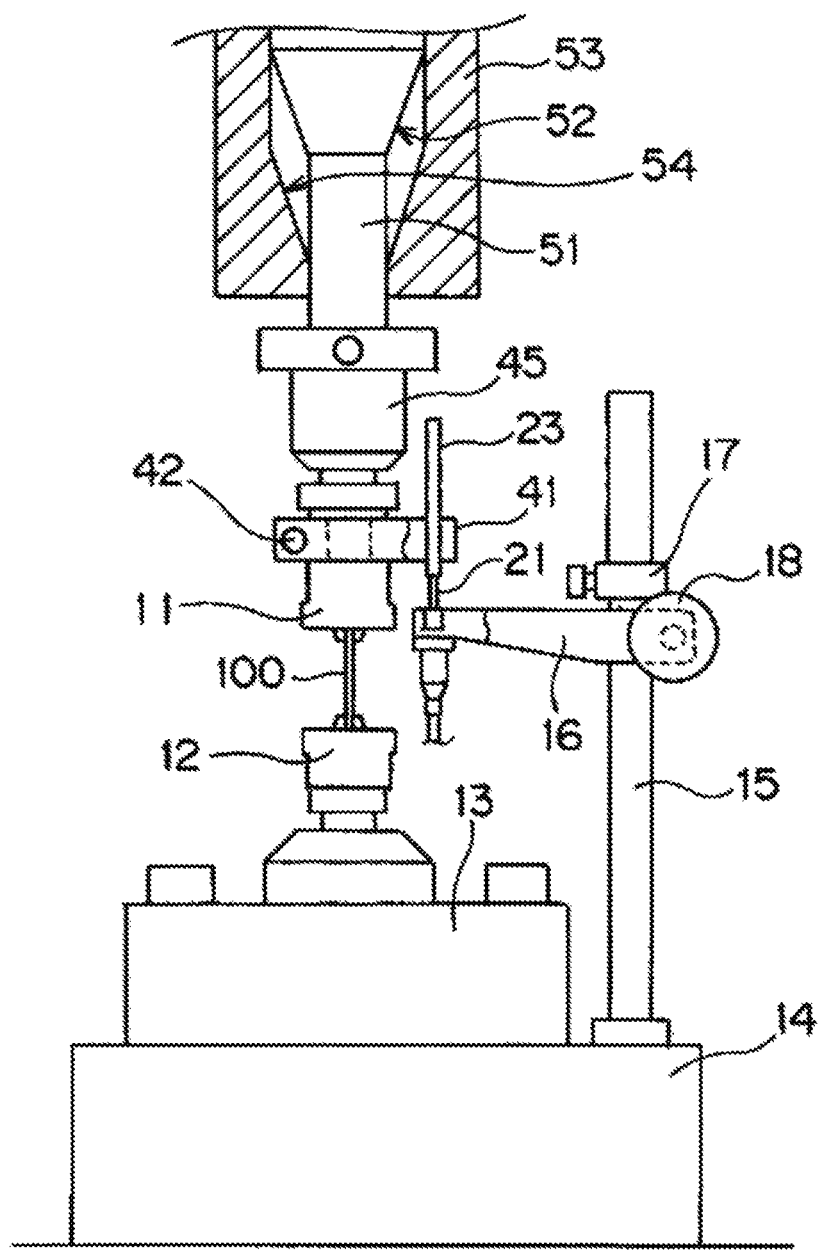
FIG. 1 is a schematic view showing main parts of the high-speed tension testing machine according to the disclosure.

Hereinafter, embodiments of the disclosure will be described with reference to the figures. FIG. 1 is a schematic view showing main parts of a high-speed tension testing machine according to the disclosure.

In the high-speed tension testing machine, a test piece 100 is provided for a high-speed tension test with upper and lower end parts of the test piece 100 gripped by a movable side grip tool 11 and a fixed side grip tool 12. The movable side grip tool 11 is supported by the lower end part of a movable member 51 via a connecting member 45. On the other hand, the fixed side grip tool 12 is fixed to a table 14 via a load cell 13.

The movable member 51 connected to the movable side grip tool 11 via the connecting member 45 is disposed in a cavity formed inside a piston 53 that is disposed above. A tapered part 52 that expands upward is formed on the upper end portion of the movable member 51. Moreover, a tapered part 54 that expands upward at approximately the same angle as the tapered part 52 is formed on the lower end part of the cavity in the piston 53. The piston 53 is driven by a hydraulic cylinder (not shown) to move up and down in the vertical direction. Therefore, when the piston 53 is raised at high speed, after an approach section that is until the tapered part 52 of the movable member 51 and the tapered part 54 of the piston 53 come into contact with each other, the movable member 51 moves upward with the piston 53 at a high initial speed. As a result, a high-speed tensile load is applied on the test piece 100.

A displacement meter for measuring the elongation of the test piece 100 during the high-speed tension test includes a movable body 23 and a fixed body 21. The movable body 23 is composed of a pipe made of a conductor, and the fixed body 21 is composed of a coil. The displacement meter has a configuration for detecting change of the inductance of the fixed body 21, i.e., the coil, caused by movement of the movable body 23 to calculate the elongation of the test piece 100.

Here, the movable body 23 of the displacement meter is connected to the movable side grip tool 11 in a state of being supported by a support member 41. In addition, the fixed body 21 of the displacement meter is supported by a support arm 16. The support arm 16 can be raised and lowered with respect to a support 15 disposed upright on the table 14 and is configured to be fixed after the height position thereof is adjusted through the function of a positioning ring 17 and a fixing knob 18.

In the high-speed tension test that is performed with the above configuration, when the piston 53 is raised at high speed, after the approach section of the piston 53 is passed, the movable member 51 rises at high speed, by which a high-speed tensile load is applied to the test piece 100 via the movable side grip tool 11. Then, due to the elongation of the test piece 100, the movable side grip tool 11 moves upward. Due to the movement of the movable side grip tool 11, the insertion amount of the coil, which serves as the fixed body 21, into the pipe that constitutes the movable body 23 of the displacement meter decreases and the inductance changes. Then, the inductance is detected, and the displacement amount of the displacement meter, that is, the elongation of the test piece 100, is calculated based on the change.

At this time, it is required to prevent positional deviation between the movable side grip tool 11 and the support member 41, which results from slippage between the movable side grip tool 11 and the support member 41 due to the inertial force when the movable side grip tool 11 rises at high acceleration. Therefore, the high-speed tension testing machine according to the disclosure adopts a configuration that brings the support member 41 and a step part of the movable side grip tool 11 into surface contact with each other, so as to prevent the movable side grip tool 11 and the support member 41 from slipping from each other even when the movable side grip tool 11 is moved at high speed or high acceleration.

Figure 2:
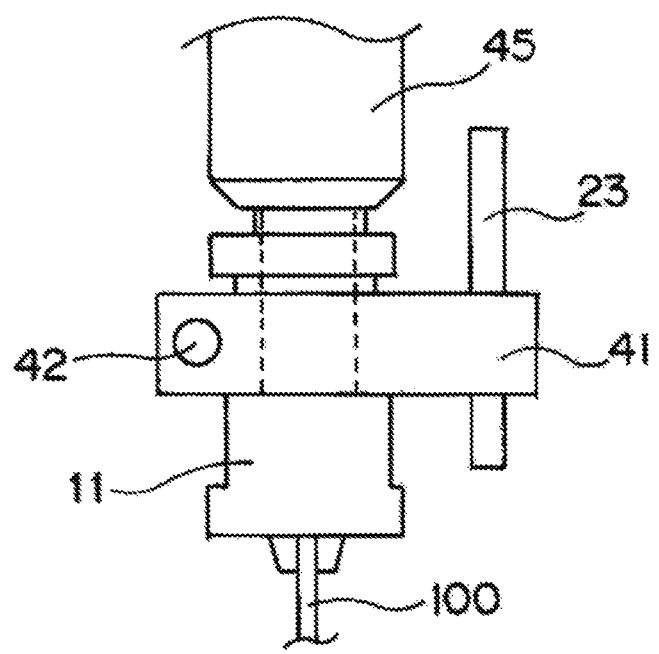
FIG. 2 is an enlarged view of the area of the support member 41 and the movable side grip tool 11 in the high-speed tension testing machine according to the disclosure.

FIG. 2 is an enlarged view of the area of the support member 41 and the movable side grip tool 11 in the high-speed tension testing machine according to the disclosure. In addition, FIG. 3 is a schematic vertical cross-sectional view showing how the support member 41 and the movable side grip tool 11 are fixed to each other in the high-speed tension testing machine according to the disclosure, and FIG. 4 is a schematic plan view thereof.

Figure 3:
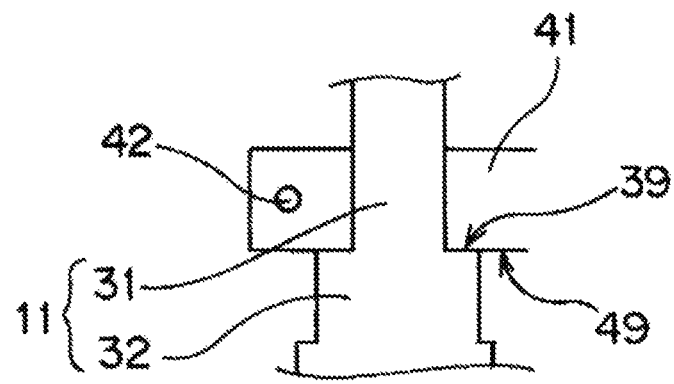
FIG. 3 is a schematic vertical cross-sectional view showing how the support member 41 and the movable side grip tool 11 are fixed to each other in the high-speed tension testing machine according to the disclosure.
Figure 4:
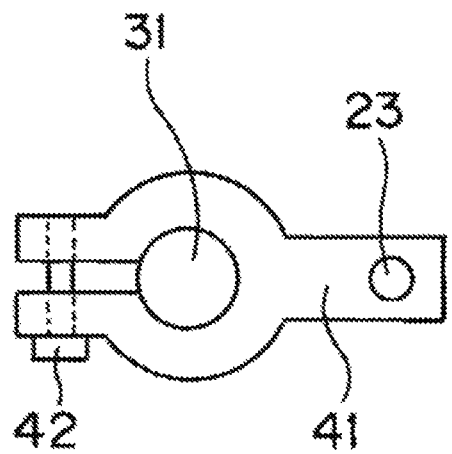
FIG. 4 is a schematic plan view showing how the support member 41 and the movable side grip tool 11 are fixed to each other in the high-speed tension testing machine according to the disclosure.
Figure 5:
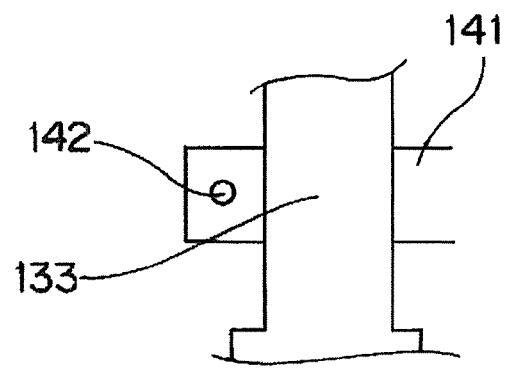
FIG. 5 is a schematic vertical cross-sectional view showing how the support member 141 and the movable side grip tool 133 are fixed to each other in the conventional high-speed tension testing machine.
Figure 6:
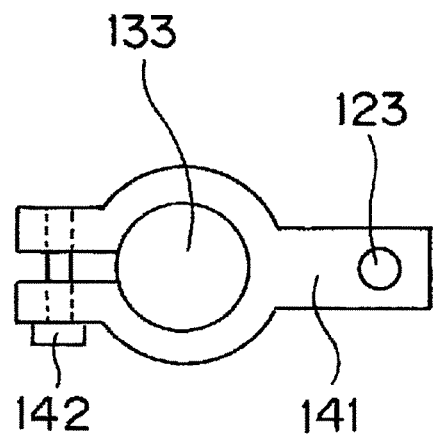
FIG. 6 is a schematic plan view showing how the support member 141 and the movable side grip tool 133 are fixed to each other in the conventional high-speed tension testing machine.

As shown in FIG. 3, the movable side grip tool 11 has a stepped shape that includes a small-diameter part 31 and a large-diameter part 32. That is, the step part is formed in an area of the movable side grip tool 11 opposite to the test piece 100. Then, as shown in FIG. 2 to FIG. 4, the support member 41 that supports the movable body 23 of the displacement meter has an end part on the side opposite to the movable body 23, and the end part has a split groove structure for surrounding the small-diameter part 31 of the movable side grip tool 11 and has a structure for holding the small-diameter part 31 of the movable side grip tool 11 with the function of a screw 42. Thus, as shown in FIG. 3, a surface 49 of the support member 41 on the side of the movable side grip tool 11 is in surface contact with a surface 39 of the large-diameter part 32, which constitutes the step part, on the side of the support member 41.

By adopting such a configuration, the movable side grip tool 11 and the support member 41 are in surface contact with each other by the surface 39 and the surface 49. Therefore, even when the movable side grip tool 11 is moved rapidly during the high-speed tension test and a high speed or acceleration acts on the movable side grip tool 11 and the support member 41, it is still possible to prevent the movable side grip tool 11 and the support member 41 from slipping from each other to prevent positional deviation between the movable side grip tool 11 and the support member 41.

As described above, according to the high-speed tension testing machine of the disclosure, it is possible to reliably prevent the movable side grip tool 11 and the support member 41 from slipping from each other even when the movable side grip tool 11 is moved at high speed or acceleration.

In the embodiment described above, the displacement meter for measuring the elongation of the test piece 100 includes the movable body 23 composed of a pipe made of a conductor and the fixed body 21 composed of a coil, and the displacement meter has a configuration for detecting change of the inductance of the fixed body 21, i.e., a coil, caused by movement of the movable body 23 to calculate the elongation of the test piece 100. Nevertheless, displacement meters having other configurations may also be used as the displacement meter for measuring the elongation of the test piece 100.

What is claimed is:

1. A high-speed tension testing machine for applying a tension testing force to a test piece, which is gripped at both ends by a movable side grip tool and a fixed side grip tool, by moving the movable side grip tool, the high-speed tension testing machine comprising:
   a displacement meter comprising a movable body and a fixed body for measuring displacement of the test piece based on a positional relationship between the movable body and the fixed body; and
   a support member connected to the movable side grip tool and supporting the movable body of the displacement meter,
   wherein a step part is formed in an area of the movable side grip tool on a side opposite to the test piece, and a surface of the support member on the side of the movable side grip tool and a surface of the step part on the side of the support member are in surface contact with each other.

2. The high-speed tension testing machine according to claim 1, wherein the movable body of the displacement meter comprises a pipe made of a conductor, the fixed body comprises a coil, and a displacement amount of the pipe is calculated by detecting an inductance change amount of the coil caused by movement of the pipe.

* * * * *